US005793494A

United States Patent [19]

Douken et al.

[11] Patent Number: 5,793,494

[45] Date of Patent: Aug. 11, 1998

[54] CRT DISPLAY DEVICE

[75] Inventors: Tomohiko Douken; Isao Kizuya, both of Hitachi; Kikuo Tomita, Hitachiota, all of Japan

[73] Assignee: Hitachi, Ltd., Tokyo, Japan

[21] Appl. No.: 8,291

[22] Filed: Jan. 25, 1993

[30] Foreign Application Priority Data

Jan. 24, 1992 [JP] Japan .................................... 4-010783

[51] Int. Cl.$^6$ ........................................................ H04N 9/07

[52] U.S. Cl. ................................................................ 358/254

[58] Field of Search ..................................... 358/246, 247, 358/248, 255; 313/313; 174/35 MS; 315/85; 445/45; 343/91, 712, 830

[56] References Cited

U.S. PATENT DOCUMENTS

| | | | |
|---|---|---|---|
| 3,206,056 | 9/1965 | Stel | 358/247 |
| 3,952,152 | 4/1976 | Lill | 178/7.82 |
| 4,329,620 | 5/1982 | Lanciano . | |
| 4,344,015 | 8/1982 | Marschika . | |
| 4,710,670 | 12/1987 | Dougherty | 313/407 |
| 4,745,300 | 5/1988 | Capek . | |
| 4,795,941 | 1/1989 | Noda | 313/479 |
| 4,845,402 | 7/1989 | Smith . | |
| 4,858,016 | 8/1989 | Suehiro | 358/246 |
| 4,916,358 | 4/1990 | Bunton . | |
| 4,949,008 | 8/1990 | Chihara | 313/402 |
| 4,987,338 | 1/1991 | Itou et al. . | |
| 4,990,825 | 2/1991 | Tsukui et al. . | |
| 5,260,626 | 11/1993 | Takase | 315/85 |
| 5,298,832 | 3/1994 | Jeong | 313/407 |
| 5,509,858 | 4/1996 | Shimoma et al. . | |

FOREIGN PATENT DOCUMENTS

| | | |
|---|---|---|
| 58-7751 | 1/1983 | Japan . |
| 59-98442 | 6/1984 | Japan . |
| 60-74882 | 4/1985 | Japan . |
| 60-251786 | 12/1985 | Japan . |
| 61-110498 | 5/1986 | Japan . |
| 62-43043 | 2/1987 | Japan . |
| 63-81899 | 4/1988 | Japan . |
| 63-269438 | 11/1988 | Japan . |
| 1-61179 | 3/1989 | Japan . |
| 1-93032 | 4/1989 | Japan . |
| 1-169855 | 7/1989 | Japan . |
| 3-122950 | 5/1991 | Japan . |
| 3-503221 | 7/1991 | Japan . |
| 4-32140 | 2/1992 | Japan . |
| 4-33240 | 2/1992 | Japan . |
| 4-94038 | 3/1992 | Japan . |

*Primary Examiner*—Sandra L. O'Shea
*Attorney, Agent, or Firm*—Antonelli, Terry, Stout, & Kraus, LLP

[57] ABSTRACT

A CRT display device having a housing which includes a ground terminal and an opening, and a CRT (cathode-ray tube) which includes a shadow mask, a tube face of the CRT being irradiated with an electron beam through the shadow mask, thereby displaying a picture in a whole region of the opening; comprising an electrically conductive shield which confronts a part of the CRT display device which extends from a peripheral edge of the shadow mask to a peripheral edge of the tube face. The shield is connected to the ground terminal. The shield makes it possible to readily fabricate a CRT display device which can prevent alternating electric fields and electromagnetic waves from leaking out of the tube face without degrading the display performance of the CRT.

11 Claims, 6 Drawing Sheets

CRT DISPLAY DEVICE

BACKGROUND OF THE INVENTION

The present invention relates to a CRT display device having a CRT (cathode-ray tube). More particularly, it relates to a CRT display device well suited to reduce alternating electric fields and radiating electromagnetic waves which leak out of a CRT.

With the advancement of microprocessors, numerous CRT display devices have been used in the fields of CAD (computer-aided design), CAM (computer-aided manufacturing), workstations, etc. In recent years, however, the CRT display devices have posed the problem that alternating electric fields, especially low-frequency electric fields (at 5 Hz~400 kHz), leaking out of these devices are harmful to the human body. The leakage fields have already become the object of legal regulation in Europe, especially in Sweden.

The CRT display device displays a picture accelerating an electron beam by a high voltage, and projecting the beam onto a phosphor layer deposited inside the tube face of the CRT of this display device, thereby causing the phosphor to luminesce. If the high voltage is a perfect DC (direct current) voltage, no alternating electric field will be generated or leak out. Since, however, the ripple component of the high voltage cannot be completely eliminated, alternating electric fields ascribable to this high voltage form the major source of generation of the alternating leakage fields.

Mentioned as a countermeasure is a proposal wherein, as indicated in Japanese Patent Application Laid-open No. 110498/1986 or No. 251786/1985, the front face of a CRT is furnished with an electrically-conductive meshed filter, with which the alternating leakage fields are reduced.

In addition, Japanese Patent Application Laid-open No. 122950/1991 proposes a method wherein a transparent conductive film is formed on the screen of a CRT by the use of fine grains which are transparent and electrically conductive, thereby attenuating electromagnetic waves (at 1 MHz or above).

Further, Japanese Patent Application Laid-open No. 81899/1988 discloses a device wherein a television set having a housing is electromagnetically shielded by disposing an additional or second housing made of an electric conductor inside the first-mentioned housing.

Finally, although the prevention of the external leakage of electric fields is not intended, Japanese Patent Application Laid-open No. 61179/1989 proposes a device wherein a belt-shaped electric conductor, which is grounded, is disposed around the front peripheral edge of the tube face of a CRT, thereby preventing the tube face from being electrified.

Among the above prior-art techniques, the method of Japanese Patent Application Laid-open No. 110498/1986 or No. 251786/1985, in which the conductive meshed filter is arranged on the front face of the CRT, has the problem that the brightness of the CRT display lowers because the light of the display picture is intercepted by the mesh parts of the filter. Another problem is that, since the light of the display picture is refracted by the filter, the picture has reduced sharpness and becomes blurred. Moreover, interference fringes of light known as a "moiré pattern" appear between the meshes of the filter and a high-definition picture in some cases, so that the method is not suited to the display of high-definition pictures.

In addition, the method of Japanese Patent Application Laid-open No. 122950/1991, in which a transparent conductive film is formed on the screen of the CRT, is liable to involve fine grains of irregular size and will result in an uneven coating of the film, which will incur nonuniformities in the reflection factor and refractive index of the film. Consequently, this method is prone to cause glare on the screen and defocus of the CRT display.

Further, the device of Japanese Patent Application Laid-open No. 81899/1988, in which a second conductive housing is disposed inside the first housing, is not explained as grounding of the conductive housing and will be incapable of effectively reducing the alternating leakage fields previously described. Moreover, no consideration is given to the leakage of those alternating electric fields from the front face of the CRT which adversely affect the operator of a system including the CRT device.

Finally, the device of Japanese Patent Application Laid-open No. 61179/1989, in which a belt-shaped conductor is disposed around the front peripheral edge of the tube face of the CRT, is intended to prevent the surface of the tube face from being electrified and is not considered with respect to the electric fields leaking from the front face of the CRT. Moreover, since the CRT is usually made of glass and has the front edge of its tube face curved, it is difficult to bring the belt-shaped conductor into close adhesion to the front edge.

SUMMARY OF THE INVENTION

An object of the present invention is to solve the problems stated above, and to provide a CRT display device which can effectively prevent alternating electric fields and electromagnetic waves from leaking out of the front face of a CRT (cathode-ray tube) without degrading the display performance of the CRT and which can be fabricated with ease.

In order to accomplish this object, in one aspect of performance of the present invention, there is provided a CRT display device comprising:

a CRT (cathode-ray tube) which includes a shadow mask, electron beam projection means, and a glass tube with the shadow mask and electron beam projection means built therein; the glass tube including a tube face which is irradiated with an electron beam passing through said shadow mask, to thereby display a picture on the tube face; the shadow mask being arranged inside the tube face;

a housing which includes a ground terminal and an opening; and shield means connected to the ground terminal, and arranged to confront that part of the CRT display device which extends from a peripheral edge of the shadow mask to a peripheral edge of the tube face of the CRT, so as to cover at least the extending part; the shield means being made of a conductive material.

The inventors measured alternating electric fields which leaked out of the front face or faceplate of the CRT (cathode-ray tube) of a CRT display device having a shadow mask. Then, it was revealed that the electric fields leaking from the central part of the screen of the CRT are at low levels, whereas the electric fields leaking from the outer peripheral edge of the screen, in other words, the part of the screen not confronting the shadow mask, are very intense. It has also been revealed that the leaking electric fields intensify more with the size of the CRT. By way of example, regarding a CRT whose screen has a size of 17 inches or above, that is, whose high voltage for accelerating an electron beam is 26 kV or above, the electric fields leaking from the peripheral edge of the shadow mask are intense, and they reach a level which is the object of legal regulations in Europe, especially in Sweden. However, even a CRT whose screen is smaller than 17 inches emits intense leakage fields in a case where the ripple of the acceleration voltage of the CRT is large. Incidentally, regarding the CRT whose screen is 17 inches or larger, the leakage from the central part of the screen confronting the shadow mask falls within the rated value of the regulations.

The measured results are interpreted as follows: At the part of the screen confronting the shadow mask, the electric lines of forces generated by fluctuations in the high voltage for the electron beam acceleration are intercepted by the shadow mask, so that the alternating electric fields do not leak out. In contrast, at the peripheral edge of the screen not confronting the shadow mask, the alternating electric fields leak out.

In this regard, with the CRT display device of the present invention, the alternating electric fields which leak out of the peripheral edge of the screen are intercepted by the shield means arranged to confront the part of the display device which extends from the peripheral edge of the shadow mask to the peripheral edge of the tube face of the CRT.

DETAILED DESCRIPTION OF THE INVENTION

[Principles of the Present Invention]

Figure 2:
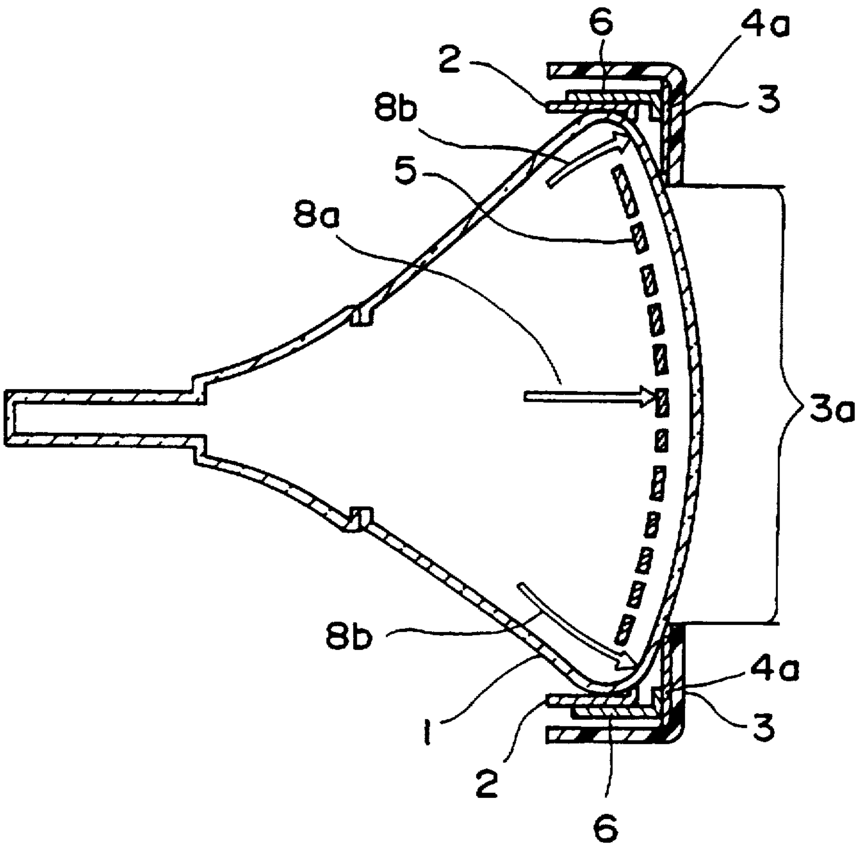
FIG. 2 is a sectional view showing some components in the construction of the embodiment depicted in FIG. 1.

As shown in FIG. 2, a CRT display device according to the present invention comprises a housing member 3 which has an opening 3*a*, and a CRT (cathode-ray tube) 1 in which an electron beam is scanned through a shadow mask 5 so as to display a picture in the whole region corresponding to the opening 3*a*. Thus, the shadow mask 5 is disposed at that tube face of the CRT 1 which is exposed outside the housing member 3 through the opening 3*a*. Therefore, the electric lines of force 8*a* corresponding to the tube face are intercepted by the shadow mask 5 of the CRT 1, and alternating electric fields do not leak out of the opening 3*a* of the housing member 3. In addition, shield means 4 (4*a* in FIG. 2) being electrically conductive is disposed around the opening 3*a*. Therefore, the electric lines of force 8*b* generated outward of the peripheral edge of the shadow mask 5 with respect to the tube axis of the CRT 1 are intercepted by the shield means 4, and alternating electric fields do not leak out. The shield means 4 should desirably be formed so as to cover or confront that part of the CRT display device which extends from the peripheral edge of the shadow mask 5 to the peripheral edge of the tube face of the CRT 1.

Figure 1:
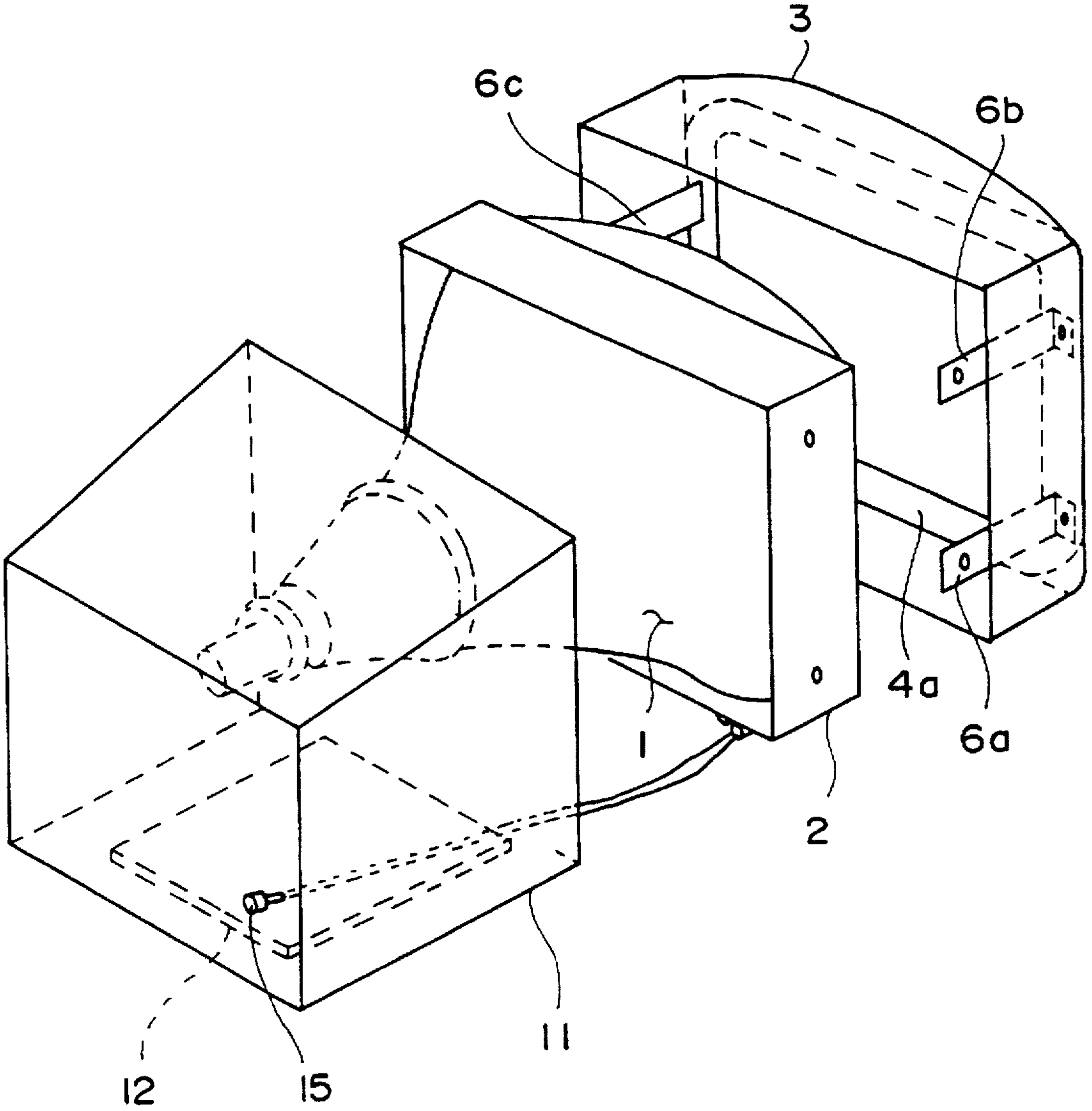
FIG. 1 is a perspective view showing various components in the construction of an embodiment of a CRT display device according to the present invention.

The shield means 4 is connected to a ground terminal 15 as shown in FIG. 1. Thus, the alternating electric fields which flow to the shield means 4 can be discharged to ground at those points of the shield means 4 which are connected to the terminal 15. Therefore, the alternating electric fields can be effectively intercepted by the shield means 4. In the inventors' experiment, the electric fields leaking from around the shadow mask 5 were especially intense in the vertical scanning direction of the electron beam as regards a device in which the electron beam is scanned horizontally. Accordingly, the effect of reducing the leakage fields can be enhanced in such a way that the parts of the shield means 4 extending along the vertical sides of the opening 3*a* are connected to the ground terminal 15 through a gounding frame 2. It is better if the points of the shield means 4 to be connected to the terminal 15 are large in number. When at least two points of each of those parts of the shield means 4 which adjoin the two vertical latera of the opening 3*a* outward with respect to the tube axis of the CRT 1 are connected to the ground terminal 15, the alternating electric fields in the interspace between the two connection points can be reduced particularly effectively. The spacing or distance between the connection points correlates with the frequency of the alternating electric field which is reduced. When the spacing is set at, at most, ¼ of the wavelength of the alternating electric field desired to be reduced, the alternating electric field having the wavelength is effectively reduced. By way of example, when the spacing is set at, at most, ¼ of the wavelength of the second harmonic of the leakage field of high frequency in the case of the multipoint connection of the shield means 4 to the earth terminal 15, the leakage field of the high frequency and the leakage field of the second harmonic of the high frequency can be effectively reduced. For the above reason, the frequency of the leaking electric field is measured, and the points of the shield means are connected to the ground terminal at the spacing which is not greater than ¼ of the wavelength of the leakage field.

To sum up, the CRT display device of the present invention consists in that the alternating electric fields which leak from the picture display region of the front face of the CRT 1 are intercepted or cut off by the shadow mask 5, while the alternating electric fields which leak outward of the picture display region with respect to the tube axis of the CRT 1 are intercepted by the conductive shield means 4 formed around the opening 3*a* of the housing member 3. Owing to such a structure, the alternating electric fields which leak out of the front of the CRT display device can be intercepted, and an operator who works in front of the screen of the CRT display device can be prevented from being exposed to the leaking electric fields.

Besides, in the CRT display device of the present invention, the picture display region is not furnished with any filter, such as a conductive mesh screen, other than the shadow mask 5. Accordingly, the display performance of the CRT 1, that is, the quality of a display picture, is not degraded. Moreover, the shield means 4 around the opening 3*a* of the housing member 3 can be easily formed by sticking a conductive sheet on the inner wall of the housing member 3 or applying a conductive coating material thereon. In this manner, the CRT display device of the present invention can effectively avoid leakage of the alternating electric fields with a simple construction.

Incidentally, in the present invention, a mask which is disposed at the tube face part of a CRT in order to display a picture has been called the "shadow mask". It is to be understood that the term "mask" shall also include a mask for displaying a picture, e. g., an aperture grille.

[Preferred Embodiments of the Present Invention]

Now, embodiments of the present invention will be described.

As illustrated in FIGS. 1 and 2, a CRT display device forming an embodiment of the present invention comprises a CRT (cathode-ray tube) 1 whose screen has a size of 17 inches and in which an electron beam is accelerated with an acceleration voltage of 26 kV and is scanned in a lateral or horizontal direction, a vessel 3 which is a front housing member and which has a rectangular opening 3*a* with its corners rounded, and a rear cover 11 which is a housing member for covering the rear part of the CRT 1. Naturally, a metal chassis is disposed within the rear cover 11. In addition, the CRT 1 is constructed to include a shadow mask 5, an electron gun assembly, and a glass tube for enveloping the shadow mask and the electron gun assembly therein.

The CRT 1 is fitted in a metal frame 2, and is fixed thereto with screws. The vessel 3 is made of plastics, and a shield 4*a* being electrically conductive is provided on the inner wall of that front part of this vessel 3 which surrounds the opening 3*a*. Further, metal jigs or straps 6*a*, 6*b* and 6*c*, 6*d* (among which the jig 6*d* is not shown) have their base ends respectively screwed at those positions of the inner wall of the vessel 3 which adjoin the two vertical latera or sides of the opening 3*a*. The shield 4*a* is held in mechanical and electrical contact with the metal jigs 6*a*, 6*b*, 6*c* and 6*d*.

The printed-wiring circuit board 12 of a circuit for electrically driving the CRT 1 is mounted on the inner wall of the bottom part of the rear cover 11. The distal ends of the metal jigs 6*a*~6*d* remote from the front part of the vessel 3 are mounted outside the metal frame 2 with fixtures as seen from FIG. 2. Besides, the rear cover 11 is snugly fitted in the vessel 3. Thus, the CRT 1 is installed within a housing which is constituted by the vessel 3 and the rear cover 11. In addition, the metal frame 2 serves as a gronding frame, and it is connected with a ground terminal 15. Consequently, the conductive shield 4*a* is connected to the terminal 15 by the metal frame 2 and the jigs 6*a*~6*d*.

In an example of this embodiment, the conductive shield 4*a* was formed in such a way that an electrically-conductive coating material containing copper was applied on the inner side of the front part of the vessel 3 and was then dried. In the example, the film of the conductive coating material after drying had a thickness of 40 microns and a sheet resistance of 0.3 $\Omega/cm^2$. The shield 4*a* is extended, at least, from that position of the front face or faceplate of the CRT 1 which confronts the peripheral edge of the shadow mask 5, to that corner of the vessel 3 at which the front and side surfaces of this vessel intersect.

Owing to such a structure, in the picture display region of the CRT display device of this embodiment, the electric lines of force 8*a* are intercepted by the shadow mask 5, so that no alternating electric field leaks out. On the other hand, at the part of the front of the CRT display device around the shadow mask 5, the electric lines of force 8*b* are intercepted by the shield means 4*a*, so that no alternating electric field leaks out.

Figures 6A, 6B:
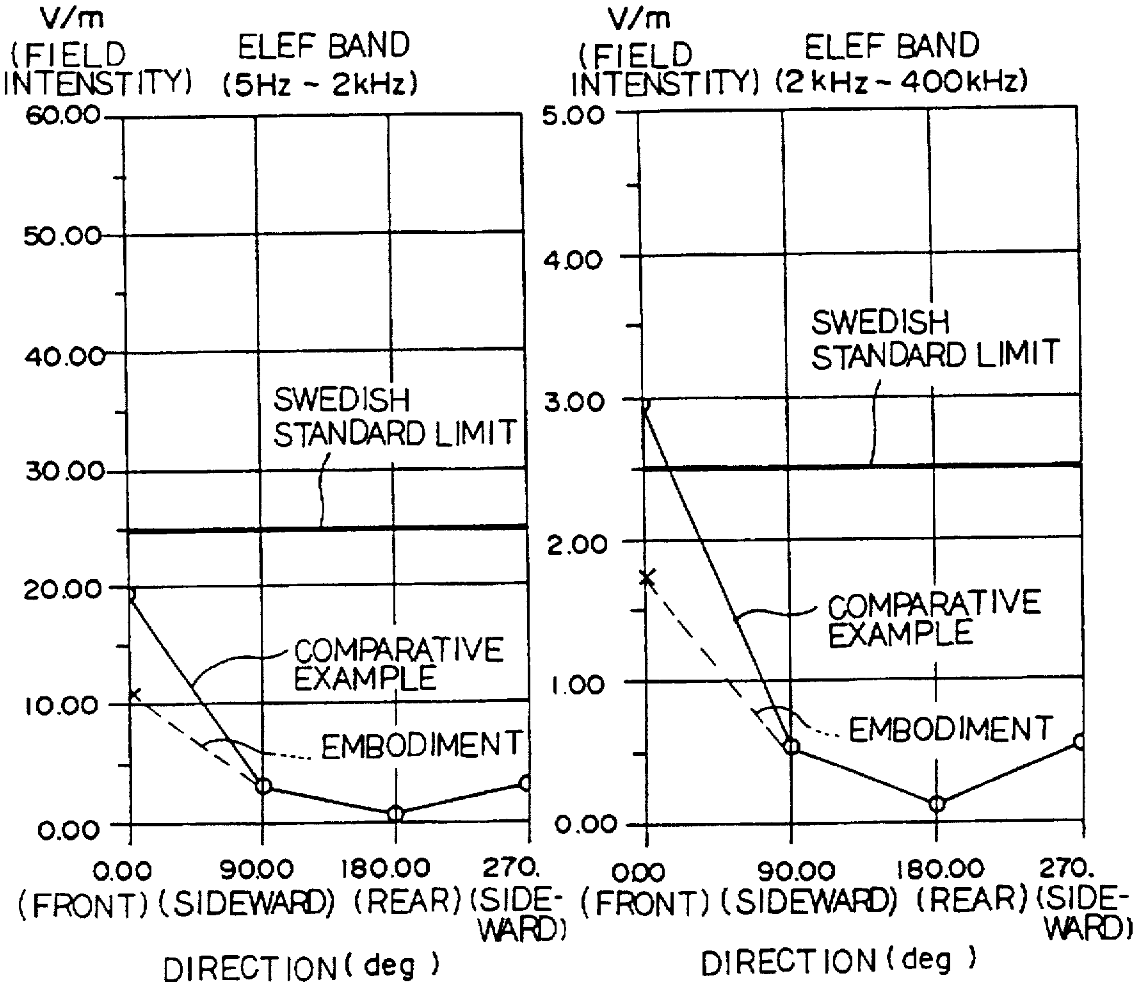
FIG. 6 is a graph showing the effect of attenuating low-frequency electric fields in the embodiment depicted in FIGS. 1 and 2.

Alternating electric fields which leaked around the example of the CRT display device of this embodiment, were actually measured. A comparative example used was a device in which the conductive shield 4*a* was removed from the CRT display device shown in FIGS. 1 and 2. The measurement of the leaking electric fields conformed to Standard No. MPR 1990.8/1990.10 of the Swedish Standards. The results of the measurement are illustrated in FIG. 6. As seen from the figure, this embodiment reduces the alternating electric fields about 8 V/m in the ELEF band (5 Hz~2 kHz) and about 12 V/m in the VLEF band (2 kHz~400 kHz) in front of the screen of the CRT display device. The reduction corresponds maximally to approximately 5 dB at the frequencies of 5 Hz~400 kHz. In the VLEF band (2 kHz~400 kHz), the alternating electric fields exceeded a Swedish regulation value in front of the comparative example, whereas they fell within the standard value in front of the example of this embodiment.

Figure 5:
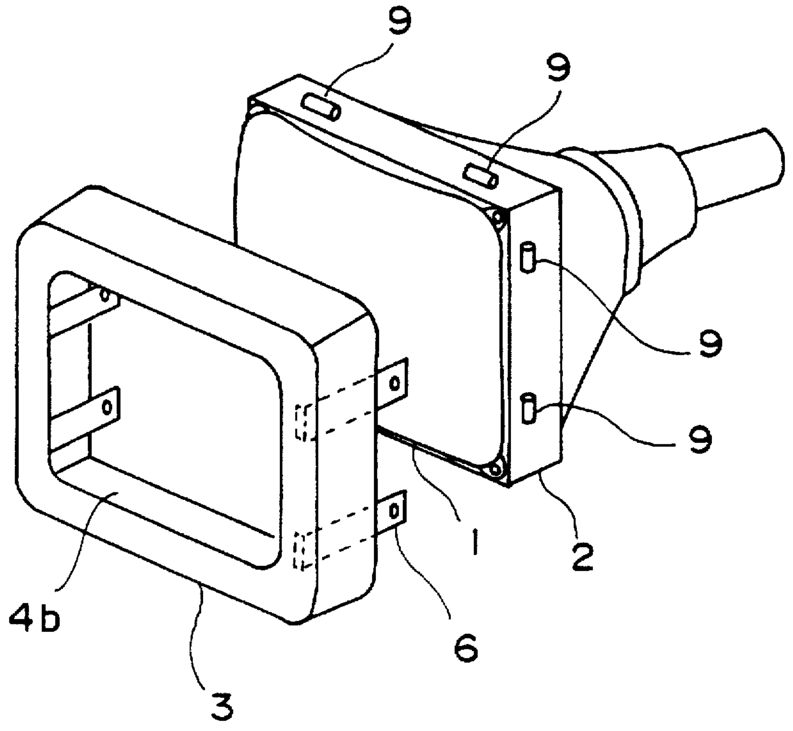
FIG. 5 is a perspective view showing some components in the construction of a further embodiment of the CRT display device of the-present invention.

Next, another embodiment of the present invention will be described with reference to FIG. 5. As shown in the figure, the second embodiment comprises a shield 4*b* which is formed on the front surface of a vessel 3 and on the inner walls of the side surfaces of the vessel 3. Further, two convex gaskets 9 being electrically conductive are disposed at a spacing or interval of about 37.5 cm on each of the latera or sides of a metal frame 2. Owing to the gasket members 9, the shield 4*b* of the vessel 3 and the metal frame 2 are held in electrical contact at eight points. The other parts of this embodiment are similar to those of the first embodiment, and shall be omitted from description.

Figure 7:
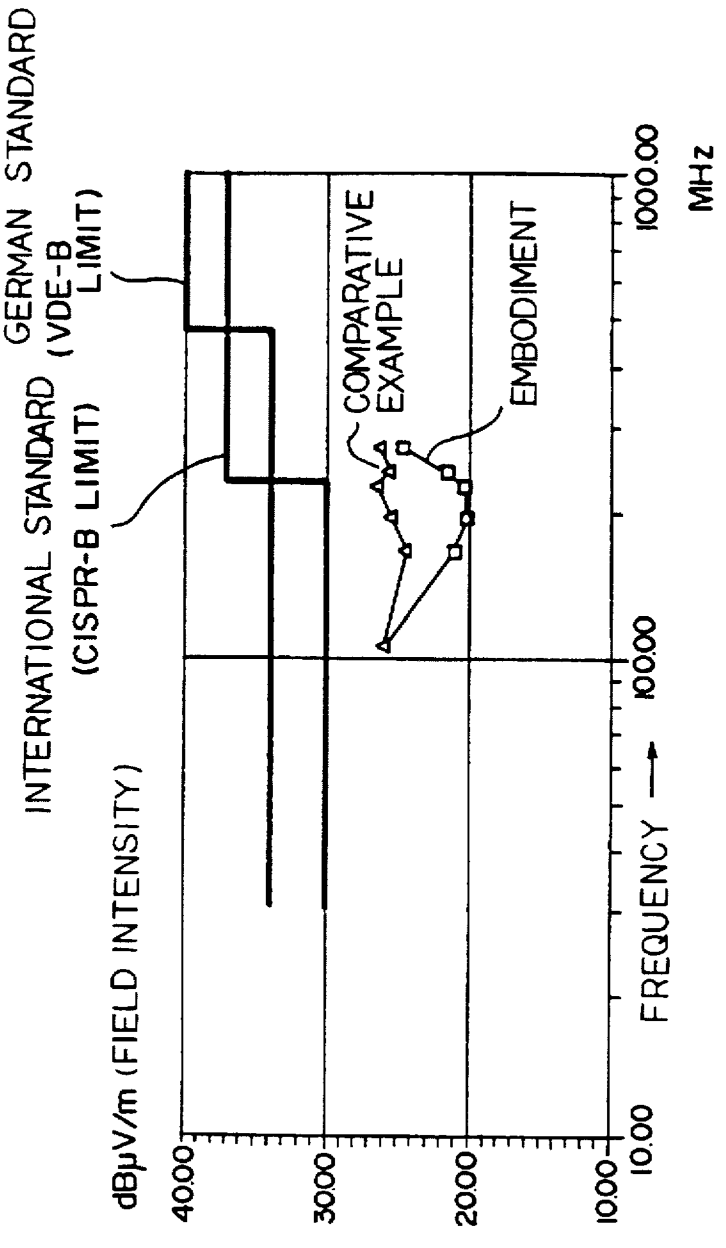
FIG. 7 is a graph showing the effect of attenuating high-frequency electric fields in the embodiment depicted in FIG. 5.

In this embodiment, the spacing of the gaskets 9 disposed on each latus of the metal frame 2 is about 37.5 cm. It is therefore possible to effectively reduce high-frequency electric fields whose electromagnetic waves have quarter wavelengths which are not shorter than 37.5 cm, that is, high-frequency electromagnetic waves at approximately 200 MHz and 200 MHz waves which are second harmonic waves of waves at 100 MHz. Leaking electric fields were measured for an example of the CRT display device of this embodiment shown in FIG. 5, and a comparative example which was a device with the shield 4*b* removed from the embodiment of FIG. 5. First, the leakage field intensities of each display device in all directions were detected for various frequencies at positions which were 10 m distant from the device. Subsequently, the directions in which the maximum values of the field intensities were exhibited were sought at the respective frequencies. Besides, the field intensities in these directions were measured. Results thus obtained are illustrated in FIG. 7. As appreciated from the illustration, the maximal reduction of approximately 6 dB has been actually measured at 200 MHz, and wider margins have been afforded relative to the limit values of the International Standards and the German Standards.

Figure 3:
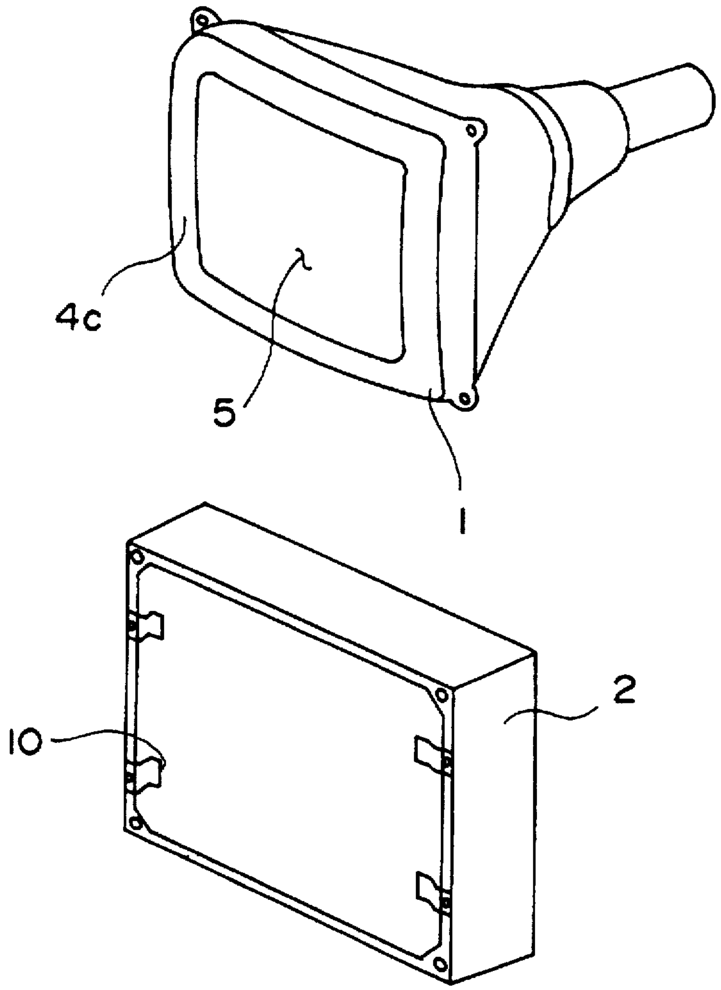
FIG. 3 is a perspective view showing some components in the construction of another embodiment of the CRT display device of the present invention.

Further, another embodiment of the CRT display device of the present invention is illustrated in FIG. 3. As shown in the figure, this embodiment comprises a shield 4*c* which is formed by applying an electrically-conductive coating material on that part of the tube face of a CRT 1 which extends from the position of the tube face confronting the peripheral edge of a shadow mask 5, to the peripheral end of the tube face of the CRT 1. In addition, two leaf springs 10 made of metal are attached to each of the vertical latera or sides of a metal frame 22 by setting the base ends of these leaf springs with screws. The other parts of this embodiment are similar to those of the embodiment in FIGS. 1 and 2, and shall be omitted from the description. When the CRT 1 is fitted in the metal frame 22, the leaf springs 10 totaling four come into contact with the conductive shield 4*c*, so that the shield 4*c* is connected with the earth terminal 15. Electric fields which leaked from an example of the CRT display device of this embodiment, were measured. The measured values were found to be similar to those attained with the embodiment of FIG. 1.

As thus far described, in each of the embodiments described above, the alternating electric fields which leak from the picture display region are reduced by the shadow mask 5, so that the brightness and sharpness of a display picture are not reduced. Furthermore, the shield 4 is formed so as to cover or conceal the part of the CRT 1 surrounding the shadow mask 5, in other words, the part of the housing member 3 surrounding the opening *3a* thereof, and it is connected to the ground terminal 15, whereby the intense leakage fields can be effectively reduced. In addition, since the shield 4 is hidden by the vessel 3 and is not visible to the operator, it can be readily formed by the use of an inexpensive material without the necessity of considering transparency, refractive index, etc. which affect the quality of the picture. Accordingly, the manufacturing cost of the CRT display device can be curtailed.

Moreover, when the vertical parts of the shield 4 extending in the vertical scanning direction of the electron beam are connected to the ground terminal 15, the leakage of the intense alternating electric fields in the lateral or horizontal direction can be effectively reduced.

The leakage of the alternating electric fields can be reduced more effectively if the shield 4 is connected to the ground terminal 15 at the spacing or interval of or below the quarter wavelengths of the alternating electric fields desired to be reduced. The shield 4 should desirably be connected to the terminal 15 in a multipoint fashion.

Figure 4:
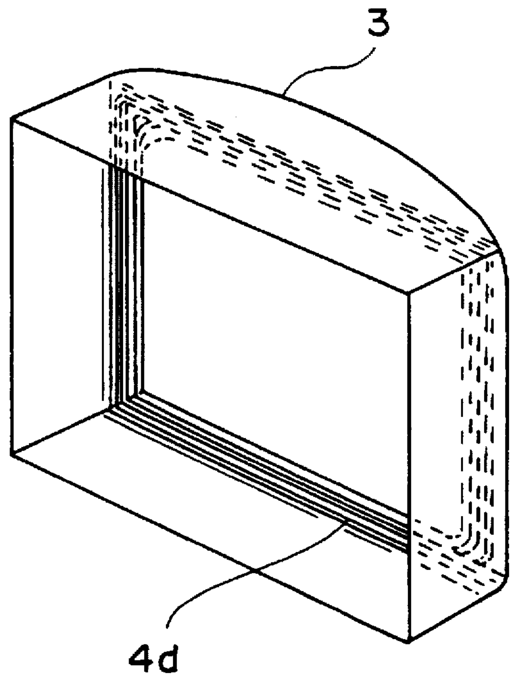
FIG. 4 is a perspective view for explaining different shield means included in the CRT display device of the present invention.

In the described before, the respective shields *4a*, *4b* and *4c* are formed by applying an electrically-conductive coating material. As shown at symbol *4d* in FIG. 4, however, a shield can alternatively be formed by sticking metal wire pieces, a metal tape or a metal sheet inside the vessel 3.

The material of the shield means 4 may be any electrically conductive material, such as copper, zinc, iron, aluminum, tin, gold or silver, or a resin containing the grains of the metal. Herein, the sheet resistance of the conductive material should desirably be 0.3 $\Omega/cm^2$ or less.

As described above, according to the present invention, electric fields which leak out of the picture display region of a CRT (cathode-ray tube) are intercepted or cut off by the shadow mask of the CRT, and electric fields which leak out of the part of the CRT surrounding the shadow mask are intercepted by shield means, whereby the alternating electric fields and electromagnetic waves can be effectively prevented from leaking out without degrading the display performance of the CRT. Moreover, the shield means can be readily formed. Therefore, the present invention provides a CRT display device which can be realized with ease and at low cost.

What is claimed is:

1. A CRT display device comprising:

a CRT (cathode-ray tube) which includes a shadow mask, electron beam projection means, and a glass tube with said shadow mask and said electron beam projection means built therein;

said glass tube including a tube face which is irradiated with an electron beam passed through said shadow mask, thereby displaying a picture on said tube face;

said shadow mask being arranged inside said glass tube;

a housing in which said glass tube is disposed and which includes a ground terminal and an opening through which said tube face projects; and shield means connected to said ground terminal and arranged so as to confront that part of said CRT display device which extends from a peripheral edge of said shadow mask to a peripheral edge of said tube face of said CRT, so as to cover at least said part, said shield means being made of a conductive material and being arranged outside said glass tube.

2. A CRT display device as defined in claim 1, wherein said opening lies inward of said peripheral edge of said shadow mask with respect to a tube axis of said CRT, and said shield means is formed around said opening.

3. A CRT display device as defined in claim 1, wherein said ground terminal is connected to at least two points of said shield means formed so as to extend in a vertical scanning direction of said electron beam.

4. A CRT display device as defined in claim 3, wherein a spacing between said two points is not greater than ¼ of a wavelength of an alternating electric field which leaks out of said CRT.

5. A CRT display device as defined in claim 1, wherein said conductive material of said shield means is a resin which contains conductive particles.

6. A method of manufacturing a CRT display device having a housing which includes an earth terminal and an opening, and a CRT (cathode-ray tube) which is received in the housing and which displays a picture through the opening; comprising the steps of:

coating an inner wall of said housing around said opening, with a resin which contains conductive particles, and then drying said resin, to thereby form a conductive shield;

connecting said conductive shield to said earth terminal; and installing said CRT within said housing.

7. A CRT display device according to claim 4, wherein the spacing between said two points is not greater than ¼ of the wavelength of an alternating electric field of the high frequency which leaks out of said CRT.

8. A CRT display device according to claim 4, wherein the spacing between said two points is approximately 37.5 cm.

9. A CRT display device according to claim 1, further including an annular grounding frame surrounding said glass tube and coupling said shield means to said ground terminal.

10. A CRT display device according to claim 9, wherein said shield means is coupled to said annular grounding frame by a plurality of spaced conductive metal jigs.

11. A CRT display device comprising:

a CRT (cathode-ray tube) which includes a shadow mask, electron beam projection means, and a glass tube with said shadow mask and said electron beam projection means built therein;

said glass tube including a tube face which is irradiated with an electron beam passed through said shadow mask, thereby displaying a picture on said tube face;

said shadow mask being arranged inside said glass tube;

a housing in which said class tube is disposed and which includes a ground terminal and an opening through which said tube face projects; and shield means connected to said ground terminal and arranged so as to confront that part of said CRT display device which extends from a peripheral edge of said shadow mask to a peripheral edge of said tube face of said CRT for shielding an area around the periphery of said tube face without shielding a majority of said tube face, said shield means being made of a conductive material and being arranged outside said glass tube.

* * * * *